US010726712B2

(12) United States Patent
Locke et al.

(10) Patent No.: US 10,726,712 B2
(45) Date of Patent: Jul. 28, 2020

(54) BUILDING BOTS INTERFACING WITH INTRUSION DETECTION SYSTEMS

(71) Applicant: SENSORMATIC ELECTRONICS, LLC, Boca Raton, FL (US)

(72) Inventors: Robert B. Locke, Sonoma, CA (US); Alessandro Scanu, Grange Cork (IE); Ana Vinogradova, Concord (CA); Jason A. Breed, Richmond Hill (CA); Gregory W. Hill, Newmarket (CA)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 64 days.

(21) Appl. No.: 16/058,050

(22) Filed: Aug. 8, 2018

(65) Prior Publication Data
US 2019/0066488 A1 Feb. 28, 2019

Related U.S. Application Data

(60) Provisional application No. 62/549,048, filed on Aug. 23, 2017.

(51) Int. Cl.
*G08B 29/18* (2006.01)
*H04Q 9/02* (2006.01)
(Continued)

(52) U.S. Cl.
CPC ......... *G08B 29/185* (2013.01); *G05D 1/0094* (2013.01); *G05D 1/0219* (2013.01); *G05D 1/0274* (2013.01); *G05D 1/0276* (2013.01); *G08B 13/22* (2013.01); *G08B 25/007* (2013.01); *G08B 25/10* (2013.01); *G08B 29/188* (2013.01); *H04Q 9/00* (2013.01); *H04Q 9/02* (2013.01); *H04W 4/38* (2018.02);
(Continued)

(58) Field of Classification Search
CPC .. G08B 29/185; G08B 25/007; G08B 29/188; G08B 25/10; G08B 13/22; H04W 4/90; H04W 4/38; H04Q 2209/40; H04Q 2209/823; H04Q 2209/50; H04Q 9/00; H04Q 9/02; G05D 2201/0207; G05D 1/0094; G05D 1/0219; G05D 1/0276; G05D 1/0274
See application file for complete search history.

(56) References Cited

U.S. PATENT DOCUMENTS 10,137,984 B1 * 11/2018 Flick .................. B64D 47/00
2016/0107749 A1 * 4/2016 Mucci ................. B64C 39/024
701/3
(Continued)

*Primary Examiner* — Rodney A Butler
(74) *Attorney, Agent, or Firm* — Arent Fox, LLP

(57) ABSTRACT

Described are techniques that use an autonomous mobile unmanned machine that includes at least one sensor device suitable to verify an alarm condition. Upon assertion of an alarm condition message asserted as a result of a potential alarm condition existing within a facility, the machine receives a location of the alarm condition and is programmed with a route from a current location of the autonomous mobile unmanned machine to the location of the alarm condition. The at least one sensor device carried by the autonomous mobile unmanned machine collects sensor data at least at the location of the alarm condition and the machine sends to a system a message pertaining to status of the alarm condition.

16 Claims, 11 Drawing Sheets

(51) Int. Cl.
*H04W 4/38* (2018.01)
*G08B 25/10* (2006.01)
*G05D 1/02* (2020.01)
*G08B 13/22* (2006.01)
*G08B 25/00* (2006.01)
*H04Q 9/00* (2006.01)
*G05D 1/00* (2006.01)
*H04W 4/90* (2018.01)

(52) U.S. Cl.
CPC . *G05D 2201/0207* (2013.01); *H04Q 2209/40* (2013.01); *H04Q 2209/50* (2013.01); *H04Q 2209/823* (2013.01); *H04W 4/90* (2018.02)

(56) References Cited

U.S. PATENT DOCUMENTS

| | | | | |
|---|---|---|---|---|
| 2016/0116914 | A1* | 4/2016 | Mucci | G05D 1/101 |
| | | | | 701/2 |
| 2016/0232777 | A1* | 8/2016 | Jedwab | G08B 13/19654 |

* cited by examiner

BUILDING BOTS INTERFACING WITH INTRUSION DETECTION SYSTEMS

CLAIM OF PRIORITY

This application claims priority under 35 U.S.C. § 119(e) to provisional U.S. Patent Application 62/549,048, filed on Aug. 23, 2017, entitled: "Building Bots Interfacing with Systems," the entire contents of which are hereby incorporated by reference.

BACKGROUND

This description relates to operation of systems in conjunction with autonomous mobile unmanned machines.

Commercial and industrial premises contain systems of various types that often require monitoring or maintenance. One example of such systems are security systems that can include fire/smoke detection, intrusion, surveillance, access control systems, etc. Conventionally, those that were manned by humans that regularly traversed a facility checking in at guard stations and making observations. Surveillance systems progressed to include closed circuit television monitoring, and more recently integrated systems have been developed to include video cameras installed at strategic locations in a facility. These video cameras are in communication with a centralized remote monitoring facility and operators at the facility visually sweep the facility from the monitoring center. These tours are scripted and timed at a user request. Upon discovery of suspicious activity, the operator can engage in a custom designed response plan.

Surveillance solutions have been discussed with respect to the use of autonomous mobile unmanned machines such as unmanned aerial vehicles, commonly referred to as drones, as discussed in US-2016-0116914-A1 "Drone Tours In Security Systems" or in US-2016-0107749-A1 "Fixed Drone Visualization In Security Systems." Other approaches to surveillance suggest the use of robots of various types. Another example of an autonomous mobile unmanned machine is an autonomous cleaning robot.

SUMMARY

Surveillance solutions often require provide verified alarm information prior to or in conjunction with dispatch of emergency personnel such as police or are required or needed for insurance purposes in the event of excessive false alarms. Many jurisdictions require alarm notifications to be verified before the police will be dispatched to the site. While prior approaches use in person verification to provide verified alarm information that may be fraught with dangers. Other solutions provide verified alarm information through video surveillance capabilities, which information is verified remotely by a human being. However, many people do not want video cameras located through-out their residence or place of business for privacy reasons. Therefore, different techniques are needed for such verification. To alleviate some of these concerns, a video enabled robot is employed within the residence or office that reacts upon an alarm condition trigger by the security system. The robot moves towards the location indicated by the alarm on the system while capturing video information to verify the alarm such that police can be dispatched.

According to an aspect, a method includes receiving by an autonomous mobile unmanned machine that includes at least one sensor device, an alarm condition message that is asserted as a result of a potential alarm condition existing within a facility, receiving a location of the alarm condition that resulted in the assertion of the alarm condition message, programming the autonomous mobile unmanned machine with a route from a current location of the autonomous mobile unmanned machine to the location of the alarm condition, collecting by the at least one sensor device carried by the autonomous mobile unmanned machine, sensor data, with the sensor data collected at least at the location of the alarm condition, sending a message to confirm the presence of the alarm condition.

Aspects include various types of autonomous mobile unmanned machines, computer program products tangible stored on a physical, a non-transitory hardware storage device or devices or systems and computer implemented methods for integrating autonomous mobile unmanned machines such as drones and robots with security systems and other systems commonly found in facilities.

The details of one or more embodiments of the invention are set forth in the accompanying drawings and the description below. Other features, objects, and advantages of the invention is apparent from the description and drawings, and from the claims.

DETAILED DESCRIPTION

Figure 1:
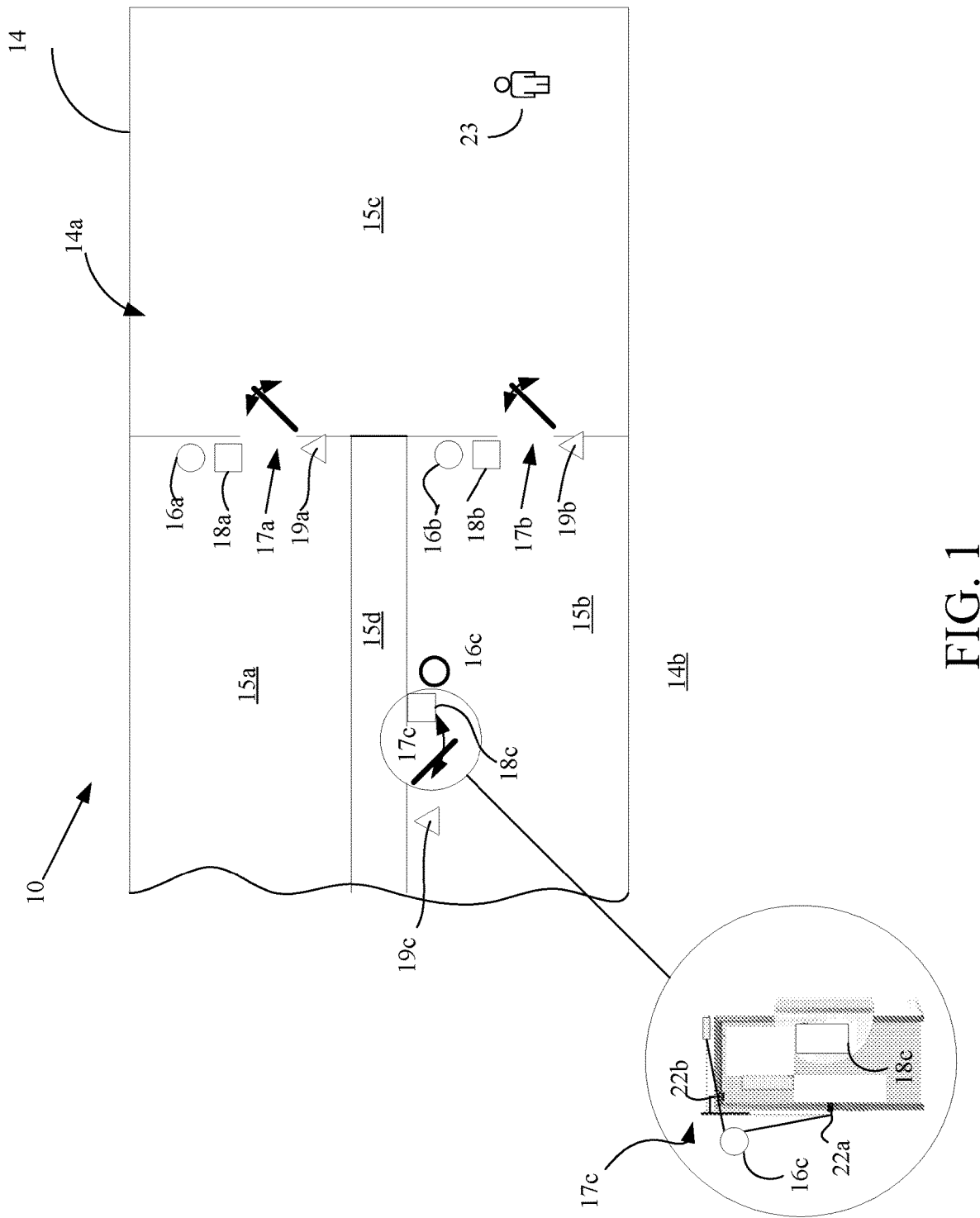
FIGS. 1 and 2 are schematic diagrams of a premises including a surveillance system at a facility with modified access control.

Referring now to FIG. 1, an example application 10 of a security system (not shown in FIG. 1, but shown in FIG. 2) installed at a facility 14 (a portion of which) is shown. In this example, the facility 14 is, e.g., a commercial, industrial, facility, with interior areas, 14a (a portion of a building as shown) and exterior areas 14b that are subject to surveillance. The buildings 14 can be of any configuration, having wide open spaces such as a warehouse, to compartmentalized facilities such as labs/offices, but which have one and generally many doors that are secured by access control systems.

In some implementations of the subject matter discussed herein, the facilities need not have a security system nor locked doors that are secured and locked via access control systems. In the event that there is not at least an access control system on doors, then other mechanisms would be use to gain access through doors for the subject matter discussed below.

In the discussion below, it is presumed that there is a security system (illustrated in FIG. 1, but more fully illustrated in FIG. 2) and which may or may not include video cameras and microphones (and other privacy intrusive sensor types), access control devices (credential readers) and secured doors that are secured by electronic locks that require proper authentication in order of a user to be allowed access through (under non-emergency conditions).

The security system may also include other systems such as fire detection, intrusion detection, etc. The security system may include non-privacy intrusive (or less privacy intrusive) sensor types such as motion detectors, noxious gas sensors, smoke/fire detectors, cameras, microphones, directional microphones, temperature sensors, vibration sensors, air movement/pressure sensors, and chemical/electrochemical sensors;

In this illustrative example, the facility 14 includes three secured rooms 15a-15c and a single long hallway 15d. Room 15a has a doorway 17a and has associated therein an access controller 16a, an ingress card reader 18a, and a proximity sensor 19a. Room 15b has two doorways 17b and 17c each having associated access controllers access controllers 16b, 16c, ingress card readers 18b, 18c and proximity sensors 19b, 19c, respectively. The hallway 15d has the doorway 17c.

A detailed typical view of a doorway is shown in FIG. 1A, with exemplary door locks 22a, 22b controlled by access controller 16c. Also shown is an autonomous mobile unmanned machine, here a robotic platform (referred to below as robot) 23 for alarm verification.

Figure 2:
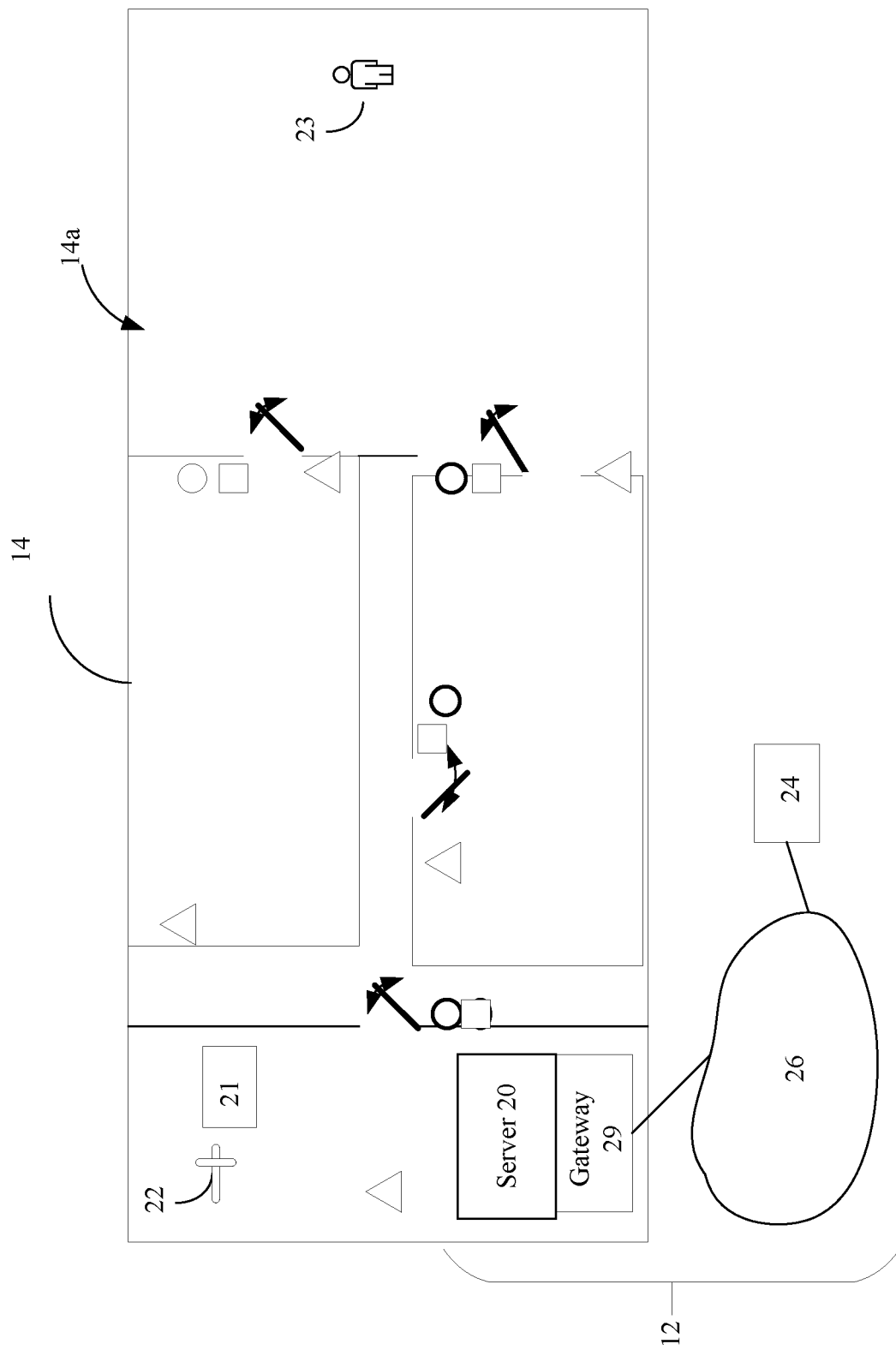

Referring now to FIG. 2, in some implementations whether involving drones (not shown in FIG. 2) or robots 23 (one being shown), the facility 14 (more of which is shown) will have one or more UAV or drone stations and/or robot stations 21. A UAV (unmanned aerial vehicle) 22 commonly known as a drone is a remotely piloted airborne vehicle, i.e., an aircraft that does not have a human pilot aboard. However, a human controls the flight of the drone remotely or in some applications the flight of the drone is controlled autonomously by onboard computers.

In the facility 14 is the security system 12. The security system includes other systems such as fire detection, intrusion detection, etc. The security system includes various sensor devices that feed sensor signals either wirelessly or via hardwired to the security system 12 from sensor devices such as video cameras, access control devices (credential readers) and which controls secured doors that are secured by electronic locks. In some instances, where video cameras are employed, the video camera cover many but not all areas of a facility, e.g., bathrooms, private areas, etc. (similar considerations apply for other privacy intrusive types of devices. In other instances, the verification machine discussed below could be used in facilities that are blanketed with privacy intrusive types of devices, i.e., in addition to such privacy intrusive types of devices.

The security system as used herein is an amalgamation or various other systems or subsystems including; access control, surveillance, intrusion detection, gas detection and fire detection systems, etc. These systems typically include panels (not shown) that connect to respective sensors and either process sensor data or send sensor data for processing by the server 20. The security system 12 includes a server 20 that is in communication with the drones 22 or robots 23, and a gateway 29 to send data to and receive data from a remote, central monitoring station 24 (also referred to as central monitoring center or central system) via one or more data or communication networks 26 (only one shown), such as the Internet, the phone system or cellular communication system being examples of others.

A robot is a combination of a mechanical machine controlled by a programmable computer that is capable of performing various actions/functions commonly performed by humans and more generally for performing a complex set of tasks. Robots of interest herein are those that are mobile and that include object avoidance systems that guide the robot about an environment to perform a specific task or tasks. Such robots may be constructed having a human-like appearance but in some implementations no regard is given to their appearance. Robots can be autonomous (i.e., perform program tasks with high autonomy, i.e., without significant human intervention or semi-autonomous, with significant human intervention.

The drone stations 21 (or robot stations) provide bases for one or more of the plural drones 22 or robots 23, e.g., for recharging and programming.

FIG. 2 also shows fixed location markers (denoted by small triangles) that are in the facility 14 and that can be any one of a number of technologies as discussed below. In some implementations, the drones carry several types of sensor/detectors 28. One type of sensor is a video camera that sends video data to the server 20. Examples of other types of sensors include microphones to send audio data. The sensors 28 may communicate wirelessly to the server 20 or can communicate through an on-board computer on the drone. In general, sensors 28 capture audio and video and send signals to the server 20. Based on the information received from the sensors 28, the server 20 determines whether to trigger and/or send alarm messages to the monitoring station 24. The monitoring station 24 is typically a central monitoring station that includes one or more servers (i.e., monitoring servers not shown). An operator at the remote control station can control certain actions of the drone. Similarly, a robot can carry several types of sensor/detectors or the robot can be of a particular function, e.g., guard tour robot.

The data or communication network 26 may include any combination of wired and wireless links capable of carrying packet and/or switched traffic, and may span multiple carriers, and a wide geography. In one embodiment, the data network 26 may simply be the public Internet. In another embodiment, the data network 26 may include one or more wireless links, and may include a wireless data network, such as a 2G, 3G, 4G or LTE cellular data network. Further network components, such as access points, routers, switches, DSL modems, and the like possibly interconnecting the server 20 with the data network 26 are not illustrated.

Figure 3:
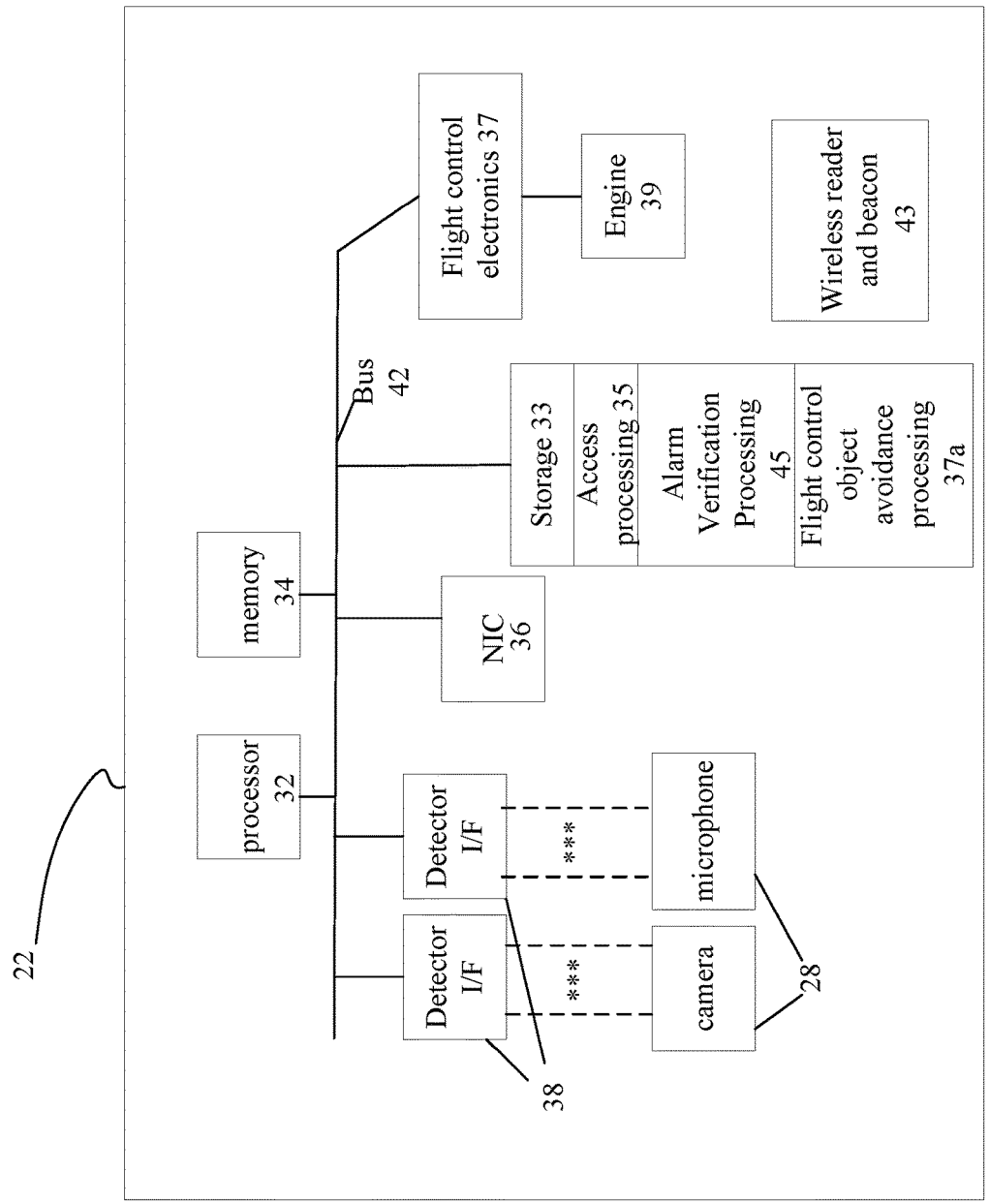
FIGS. 3 and 4 are block diagrams of drone and robotic control circuitry respectively.

Referring now to FIG. 3, details on an exemplary drone 22 are shown. The drone 22 includes processor 32 and memory 34, and storage 33 and a wireless network interface card (NIC) 36 all coupled via a bus 42. The drone 22 also includes one or more sensors 28 and one or more interfaces 38 to receive sensor data from the sensors 28. Illustrated for explanatory purpose are camera and microphone sensors 28 and interfaces 38 for those sensors. The sensors 28 are coupled to the interfaces 38 either via hard wiring or wirelessly. The drone 22 also includes flight control electronics 37 (and processing 37a) generally conventional, and one or more electric motors 39 to control one or more propellers (not illustrated). The drone 22 includes a body that can be either that of a plane or a helicopter. The drone flight control electronics 37 are response to control signals received by the processor via the wireless interface card that allow a remotely positioned operator to control flight of the drone and control the camera and microphone sensors 28 on the drone. The drone 22 also includes access processing 35 as will be discussed below. The drone also includes a wireless beacon and reader 43. The drone 22 also includes alarm verification processing 45, as will be discussed below.

Figure 4:
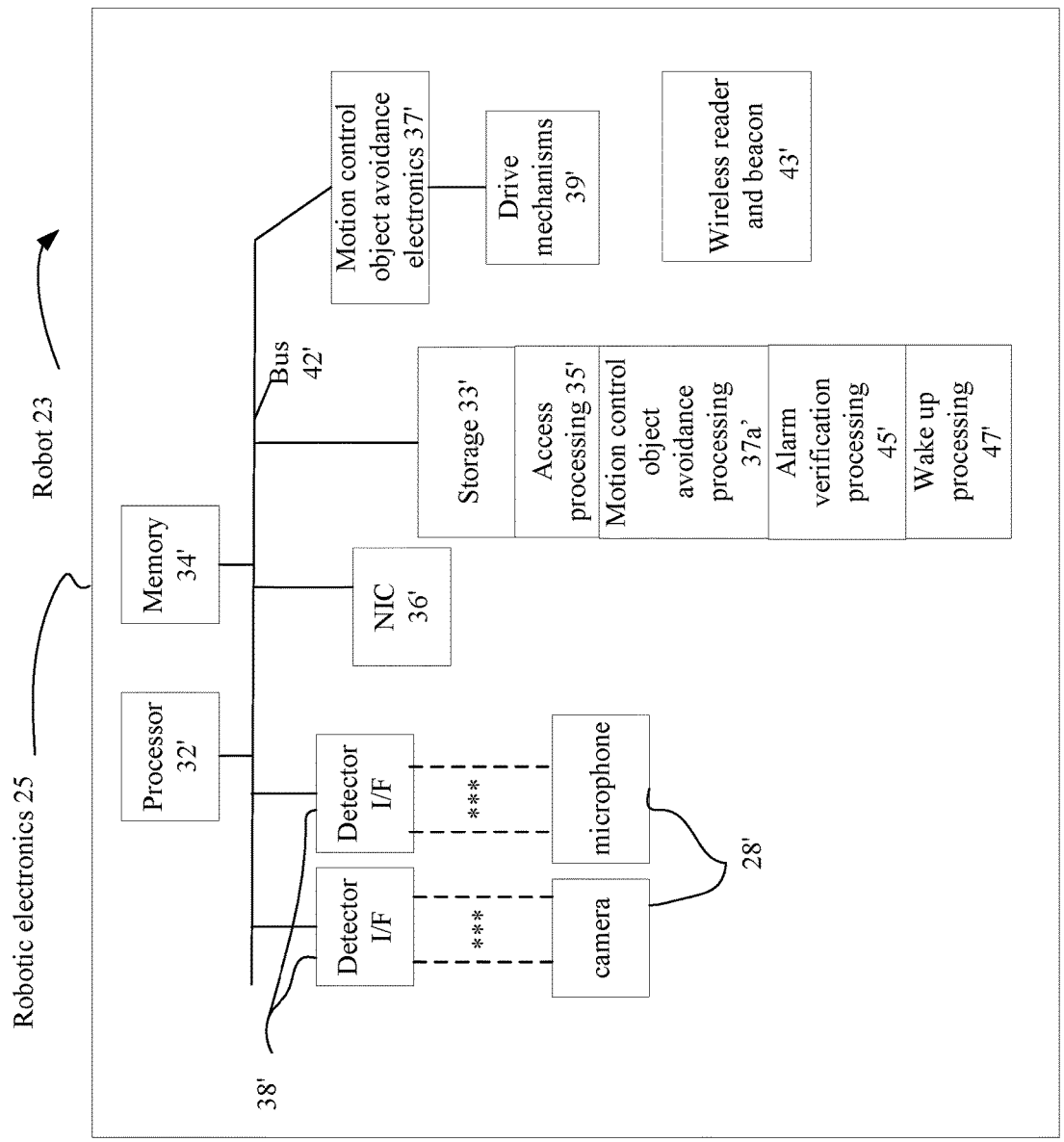

Referring now to FIG. 4, robotic processing electronics 25 carried on an exemplary robot 23 are shown. The robot 23 includes processor 32' and memory 34', and storage 33' and a wireless network interface card 36' (NIC) all coupled via a bus 42'. The robot 23 also includes one or more sensors 28' or operational devices (e.g., a fire or gas leak suppression device or any others) and one or more interfaces 38' to receive sensor data from the sensors, if so equipped. Illustrated for explanatory purpose are camera and microphone sensors 28' and interfaces 38' for those sensors 28'. The sensors 28' are coupled to the interfaces 38' either via hard wiring or wirelessly. The robot 23 includes a built in or detachable fire and/or gas detection sensor. The robot includes a processor 32' and memory 34' as discussed above that executes programs that can detect a condition that would require attention from applying analysis to sensor data from various sensors including the built in or detachable fire sensor and/or gas detection sensor. As the robot 23 conducts regular security rounds, the fire sensor and/or gas detection sensor on the robot can detect the presence of smoke, fire or a specific type of gas as being present in the building. The robot 23 can either send raw sensor data to a fire detection system or preprocess that data to verify the detected condition, such as by running a test to ensure that the sensors did not malfunction and notify the fire detection system based on the preprocessing.

The robot 23 also includes motion control/object avoidance and navigation electronics 37' and processing 37a' (generally conventional), etc., and drive mechanisms 39'. The robot 23 can include a body that can be merely a mechanical frame holding various appendages of the robot 23 or that of a humanoid appearance. The electronics are response to control signals received by the processor via the wireless interface card that allow either a remotely positioned operator to control the robot 23 or provide the robot 23 with autonomous control and control the camera and microphone 28' or function on the robot 23. The robot 23 also includes access processing 35' as will be discussed below. The robot 23 also includes a wireless beacon and reader 43'. The robot 23 also includes alarm verification processing 45', as will be discussed below.

Either the drone 22 or the robot 23 can be used for various purposes. For example, a drone can be guided through corridors etc. to reach a location of interest either by an operator or in an autonomous manner by following a programmed flight pattern and applying guidance processing to allow the drone to follow the pattern, i.e., without an operator at security monitoring station guiding all of the drone's movements. In the context of a facility that includes the security system 12, especially when the security system 12 includes access control that requires human authentication to pass through a door, the conventional approaches to guidance of a drone 22 or robot 23 are insufficient.

Figure 5:
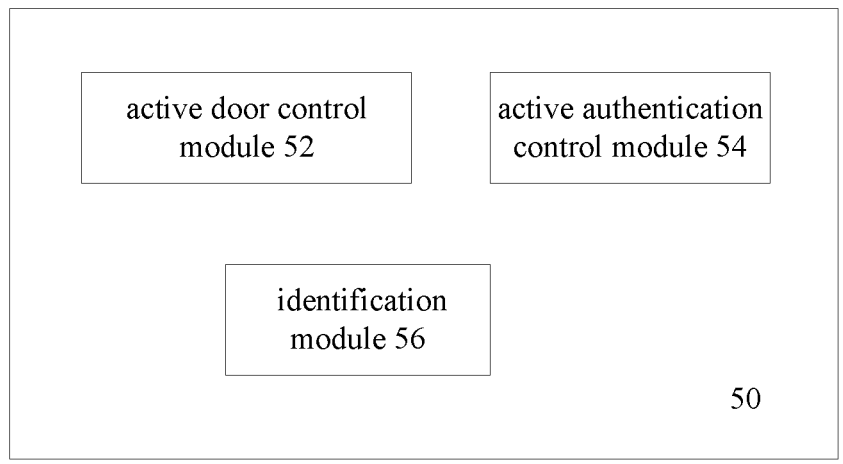
FIG. 5 is a block diagram of an access module.

Referring now to FIG. 5 components 50 of the door access processing 35 or 35' are shown. These components 50 apply to either the drone or the robot implementations. The door access processing includes an active door control module 52, an active authentication control module 54 and an identification module 56. The active door control module 52 includes processing that causes, the drone or robot to send a request to an appropriate access controller device that controls access through a particular door. The request will include a message that indicates that the drone or robot seeks access through a particular door. The message will include the drone or robot ID from the identification module 56. In some implementations, an active authentication control module 54 is used to exchange credentials between the robot and the system performing the access processing, in a more secure manner than mere presentation of a drone or robot identification.

Authentication and tracking appliances are fixed, e.g., in physical locations inside the facility, e.g., at locations in the facility where there is a door (see FIGS. 1 and 2). These appliances can be beacons that send out a short distance message that identifies the appliance and hence the door associated with or at least adjacent to a door. The beacon message can include other credentials that are used in conjunction with credentials on the robot or drone to authenticate the beacon to the robot or drone or vice versa. Each beacon can be valid within respective assigned detection zones.

The drone 22 is programmed to fly a pattern around the inside of the facility, e.g., providing sensor data that can be in various forms, as mentioned above. Similarly, the robot 23 can move about the inside either carrying sensors for surveillance and/or performing tasks such as vacuuming. Other tasks that can be performed by either the robot or the drone are a visual inspection of items in the facility such as an inspection of fire extinguishers, or tasks such as people counting, in case of building evacuations. In the implementations, involving sensor data, the sensor data are sent back to the security monitoring center where, e.g., video or other data are stored and viewed.

The drone 22 (or the robot 23) will have a programmed pattern or plan that will include locations of doors that the drone or robot are allowed access to and the order in which the drone or robot accesses these doors. That is, the programmed pattern or plan assigned to the drone (or the robot) can be a fixed sequence meaning that the drone or robot follows a defined sequence or order of physically adjacent or proximity access requests through door, which the robot 23 or drone 22 request one after the other. In other implementations, the pattern or plan involves randomizing or pseudo-randomizing the order that the drone or robot takes, so that, for example, a bad actor cannot predict where the autonomous mobile unmanned machines, e. g., robot/drone will or will not be at a certain time or where it will go next. The server 20 system and/or the central monitoring station continually receives signals from various sensors either on the drones or within the facility to track the drone or robot. The server 20 applies processing to the data to verify that the drone or robot are operating according to plan.

Figure 6:
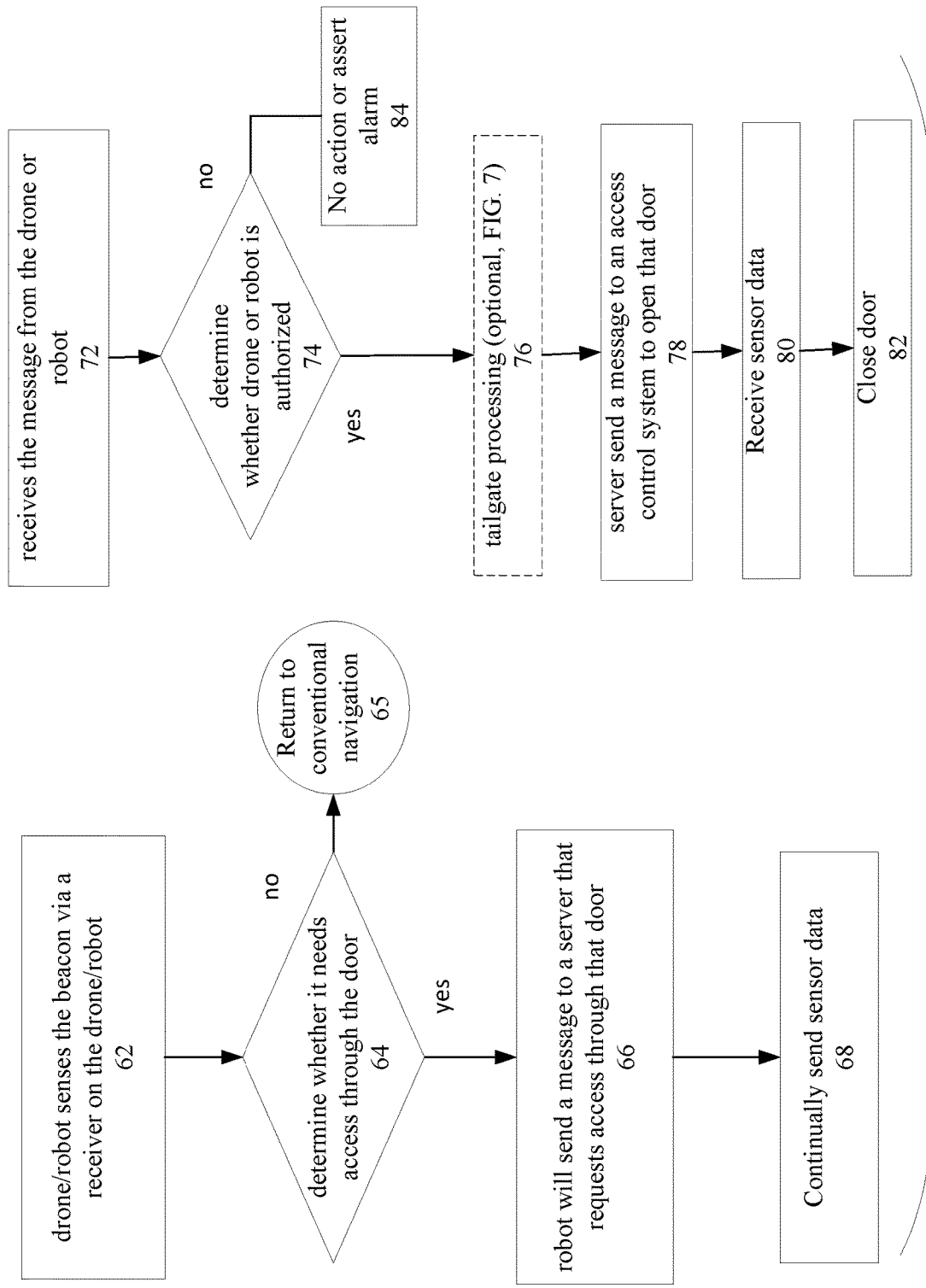
FIGS. 6-7 are flow diagrams of access processing.

Referring to FIG. 6, irrespective how the drone is programmed to fly or the robot is programmed to move to a particular location within a facility, exemplary door access processing 35 is as follows: at 62 the drone or robot senses the beacon via a receiver on the drone or robot. At 64 the drone or robot will determine whether it needs access through the door. When the drone or robot determines it needs access through the door at the specified location identified by the beacon, at 66 the robot will send a message to either a server or more likely the access control system that is modified to receive such messages. The sent message is a request to open the specific identified door. Upon the server/access control system unlocking the door, the appropriate one of those systems sends a message that is received from either the server or the access control system that indicates the door has been unlocked, allowing the drone or robot to continue moving and to send to the server sensor data at 68. When the drone or robot determines it does not need access through the door, at 65 the process can exit or return to sense a subsequent beacon and the drone or robot proceeds with its conventional navigation.

At 72 the server (or access control system) receives the message from the drone or robot and at 74 determines whether the drone or robot is authorized (and optionally authenticated) to gain access through the door. Prior to or in conjunction with or after determining that the drone or robot is authorized, at 76 the server can perform tailgate processing. When the server or access control system determines that drone or robot is authorized access through the door at the specified location identified by the beacon, and optionally at a specified authorized time, at 78 the server will send a message to the access control system or the access control system will cause the electronic locks to unlock and in some instances will also open the identified door. The drone or robot continues to send and at 80 the server receives sensor data over the flight path/movement path. Once drone or robot passes through the door, the drone or robot will return to conventional navigation and/or await detection of a next beacon.

The system server either can sense that the robot has passed through, or wait a very short defined time allocated to ensure the robot has passed through, etc. before closing the door at 82. The time allocated would depend on a number of factors, including distance between drone/robot and door upon opening the door, the speed at which the robot/drone can travel, etc. This period can be relatively short, e.g., a second or so up to about a minute or less. A workable range would be 2 seconds to 10 seconds, but any numerical range within the above range would be within scope of the described subject matter.

If the server (or access control system) receives the message from the drone or robot and determines that the drone or robot is not authorized (or optionally not authenticated) to gain access through the door, no action or an alarm can be asserted at 84.

Figure 7:
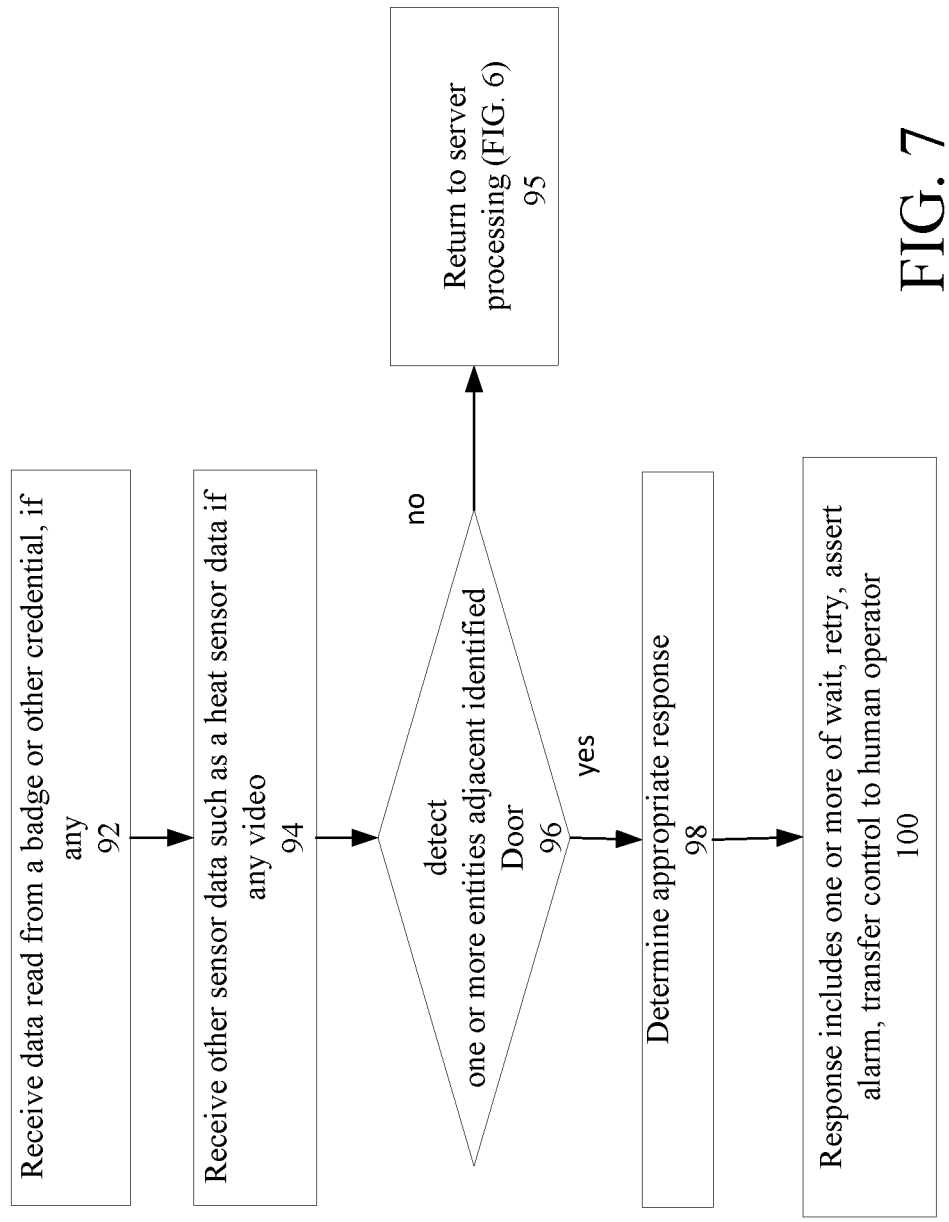

Referring now to FIG. 7, tailgate processing performed at 76 is described. Once the drone or robot arrives at the specific location in the facility where the drone or robot is waiting for access, the drone hovers (or the robot waits) at that location in the facility by entering a hover mode waiting for the door to open. However, there exists a security concern while the drone or robot is waiting for the door to open (or even as the drone or robot approaches the door and detects the beacon). In this instance, an unauthorized entity, (or indeed an authorized entity) e.g., another robot/drone, or more likely a human, without (unauthorized entity) or with (authorized entity) proper credentials (e.g., badge, etc.) can slip through the door with the robot and go undetected.

The facility will include RFID detectors/sensors (proximity and/or r.f. id sensors) to try to read a badge or other credential at 92. Alternatively, or in addition, other sensors such as a heat sensor or video surveillance cameras together with video analytics can be used to detect a person. The system will read any number of badges or at 94 receive the heat sensor data or results of video analytics processing and detect entities in an area around the door at 96. If none are detected, at 95 it returns to server processing at 78 (FIG. 6).

Badges can be detected using an r.f. id antenna having a suitable range of operation, e.g., 50-500 cm or 50-100 cm or so. The credentials for these badges are sent to the server and the server determines whether any of these are not authorized access through the door. Note RFID is but one technology. Other technologies for such detection of a human can involve or include Bluetooth, facial recognition using video analytics on video signals. Typically, RFID in access control is a "near field" technology only. So sweeping an area for RFID tags may not be typical. More likely, the system can command the person to present an access badge to the reader before the system allows access to the drone or robot.

When any of the read badges that may be in the area around the door are not authorized access through the door, at 98 the server will determine an appropriate response(s) and at 100 issue the response indication, e.g., an alarm, or a message to the drone or robot to wait and retry at a future time, transfer control to a human operator, and may assert another type of alarm. Also, the door remains locked.

The detectors/sensors can also include proximity and r.f. sensors that sense electronic devices using an r.f. antenna having a suitable range of operation, e.g., 50-500 cm or 50-100 cm and the other sensors such as the heat sensors in proximity to the door. If those sensors detect a person (e.g. by detection of a heat signature of a person or presence of an r.f. device, e.g., a tablet computer or cell, e.g., smart phone), but without any credentials, the system will issue an indication, e.g., an alarm or a message to the drone or robot to wait and retry at a future time and more likely will assert another type of alarm to the security system 12.

In addition, or alternatively, a camera can be used to view the drone or robot and capture video analytics can be used to determine if any other entities are adjacent the door. The video analytic processing upon detection of unauthorized entities will modify the drone fly pattern or the robot movement pattern to wait until the other entities have passed. When the drone or robot is in autonomous mode, the modified pattern can be accomplished by the server 20 producing a new pattern taking into consideration results of analytics processing and reprogramming the drone or robot with the new pattern. Alternatively, the server 20 can cause the control of the drone or robot to be transferred to an operator.

If intrusion is detected by other sensors within a facility, such as a window being opened or a glass break detector or a shot, e.g., gunshot being detected, e.g., a "live shooter" incident, such systems contact the server 20 and suspend all drone or robot movements through closed doors.

Within the facility guidance of a drone or robot are accomplished various well-known processing techniques that are generally available in commercial drones 22 or robots 23. Such techniques include use of feature recognition to follow a preprogrammed map of the interior of the facility. Another type of navigation is a map based type navigation that includes a database that stores images of landmarks, descriptions of items and navigation instructions. A third type of navigation is by r.f. (radio frequency) beacons being deployed within the facility, sending out r.f signals that a guidance system on board the drone or robot captures and uses to apply a triangulation algorithm to figure out a current location. The guidance techniques can be r.f.-based, sonar-based or optical-based. Guidance can be assisted by use of commercially available virtual wall barriers.

The access control system can use public key infrastructure (PKI) that is a set of hardware, software, people, policies, and procedures needed to create, manage, distribute, use, store, and revoke digital certificates and manage public-key encryption for secure electronic transfer of information to improve upon simple authentication techniques by merely presenting a fixed set of credentials from the platform to the access control system. In cryptography, PKI binds public keys with respective user identities by means of a certificate authority (CA) within a CA domain. The user identity is unique within each CA domain, thus such uniqueness could be associated with the platform, e.g., the robot or drone.

Drone Characteristics

Drones employed herein are selected according to the type and nature of the surveillance. For example, when the drones are employed to hover, a helicopter type drone might be preferable to an airplane type drone. A drone within the building that has wide open spaces can be in general larger than one employed in a building that has many rooms and corridors. Thus, a typical wing span for a drone in may wide open spaces can be 1 to 5 feet (0.3 to 1.5 meters), whereas inside the wing span would likely be less than 1 foot (0.3 meters) or no greater than the width of the smallest door opening. In addition, when used inside the drone should be powered electrically, e.g., fuel cell and/or batteries. These are however general considerations and specific applications would govern actual implementations. Various sensors can be carried by the drone, thus sensors include microphones to sense sound, and cameras to capture images and/or video. However, other sensors can include sensors to capture motion, vibration, pressure, heat, and so forth, in an appropriate combination to detect a true condition in a facility.

Robot Characteristics

Robots employed herein are selected according to the type and nature of the function that can be either a security function and/or another function, such as cleaning. For example, when robots are employed to clean, any style may be used but when employed for security, a humanoid type might be preferred. A robot within the building should have a width dimension no greater than the width of the smallest door opening. In addition, the robot should be powered electrically, e.g., fuel cell and/or batteries. These are however general considerations and specific applications would govern actual implementations. Various sensors can be carried by the robot as with the drone discussed above.

The memory stores program instructions and data used by the processor. The memory may be a suitable combination of random access memory and read-only memory, and may host suitable program instructions (e.g. firmware or operating software), and configuration and operating data and may be organized as a file system or otherwise. The program instructions stored in the memory may further store software components allowing network communications and establishment of connections to the data network.

Door Characteristics

When robots are employed the characteristics of the doors may be more flexible than when drones are employed. As a baseline, the doors have associated access control systems. The doors are electrically powered doors that have an electronic locking mechanism controlled by the access control system. The electrically powered doors automatically open and close electronically upon actuation by the access control system or the like.

In some instances, the doors can be non-powered, that is after being unlocked could be pushed open by a robot, presuming the robot was capable of applying the requisite force. For example, under the American Disabilities Act closure hardware are required to be activated by no more than 5 lbs. of applied force to open the door. A robot that could apply the requisite force to open the door could be used in lieu of the automatic electrically powered doors as mentioned above.

Discussed below is alarm verification processing. More specifically discussed below is alarm verification processing for physical intrusions into premises, especially commercial/industrial premises. The discussed intrusion alarm verification processing, can be adapted to other types of alarm verification processing for other types of alarm systems.

Intrusion Alarm Verification

Many jurisdictions require alarm notifications to be verified before police are dispatched to a site. The verification can either be done by a person or through video surveillance capabilities that are verified remotely by a human being. However, many people for privacy reasons do not want be constantly subject to video surveillance and the mere presence of cameras located through-out a residence or place of business would be undesired. Discussed below is a different method for performing such verification.

Figure 8:
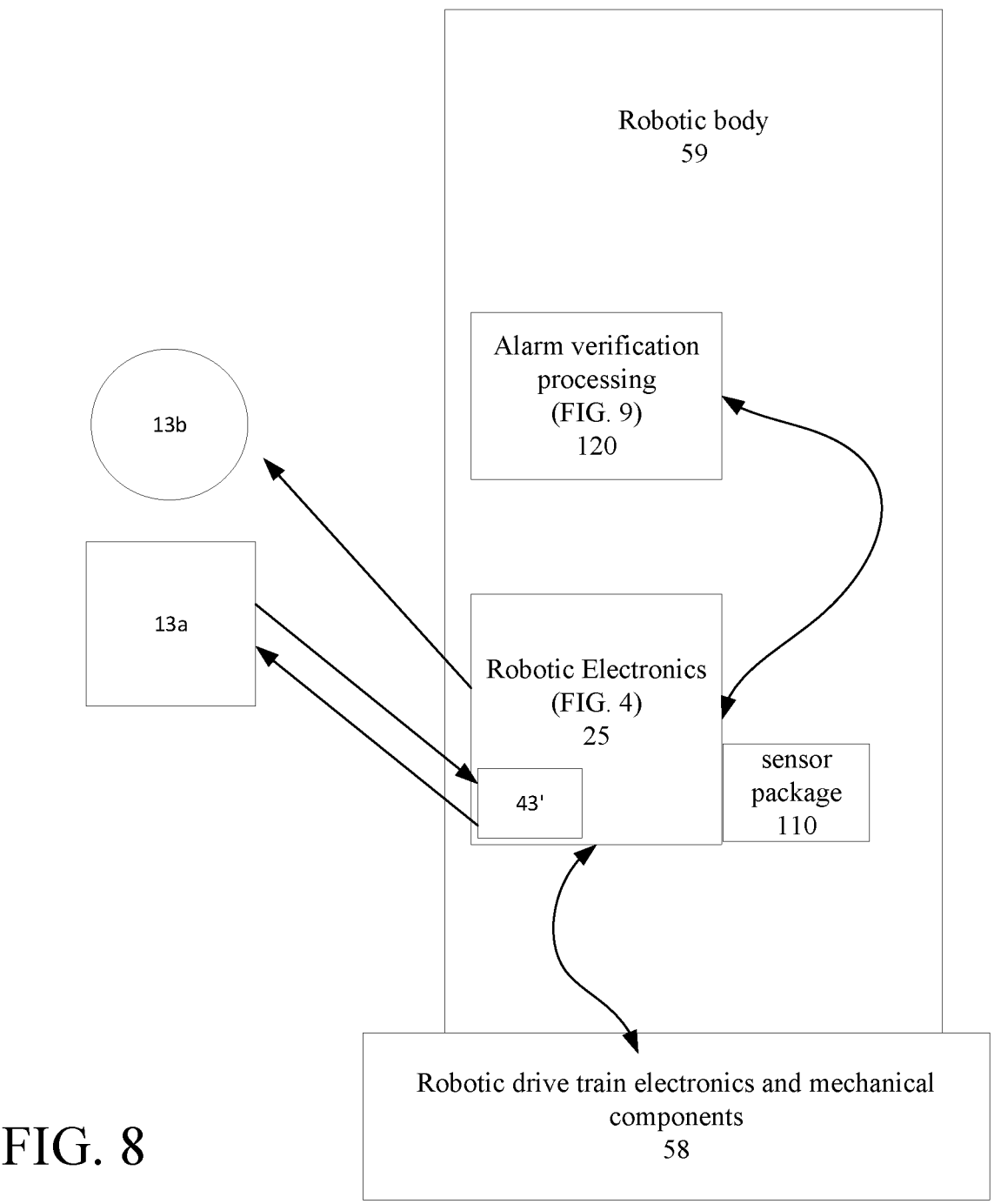
FIG. 8 is a block diagram of a robot platform.
Figure 9:
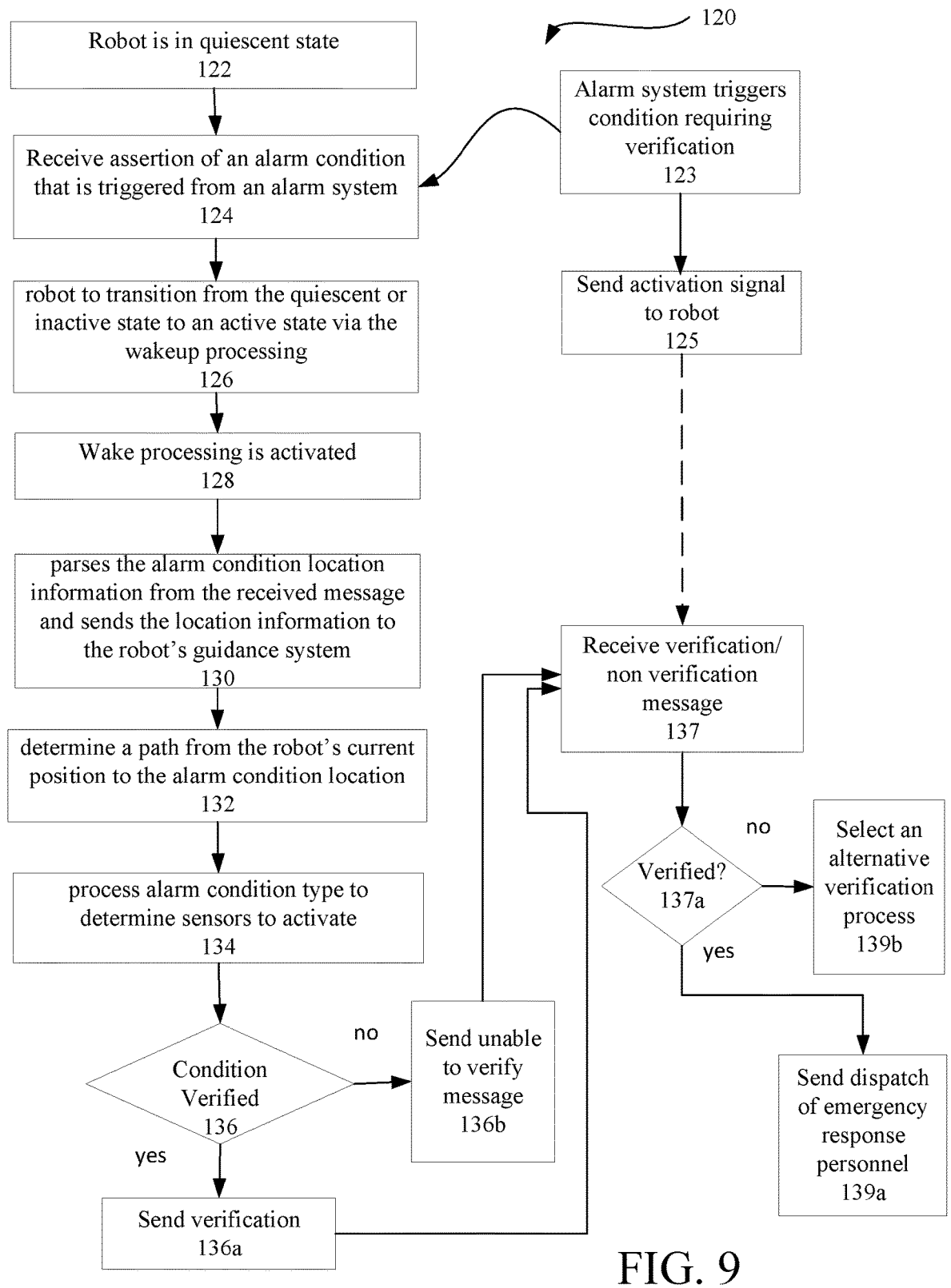
FIGS. 9-11 are flow diagrams alarm verification processing for various types alarm conditions, which is executed by the robot platform of FIG. 8.

Referring now to FIG. 8, the autonomous mobile unmanned machine, e.g., a robot 23, as discussed above in FIG. 4, includes robotic drive train electronics and mechanical components 58, robotic electronics 25 (FIG. 4) and alarm verification processing 120 (FIG. 9). The robot 23 also includes an extended sensor package 110 comprising in addition to sensors discussed in FIG. 4, other sensors, e.g., cameras and other sensors of many different types of sensors. Examples of such sensors include motion detectors, noxious gas sensors, smoke/fire detectors, video sensors, such as cameras, audio sensors such as microphones, directional microphones, temperature sensors such as infrared sensors, vibration sensors, air movement/pressure sensors, chemical/electro-chemical sensors, e.g., VOC (volatile organic compound) detectors. The exact sensor package would typically be chosen based on the alarm verification agent application(s) assigned to the robot.

In some implementations, the robotic electronics 25 uses the wireless communication reader and beacon 43' (FIG. 4) that employs any short distance wireless technology such as Bluetooth, Blue Tooth Low Energy (BLE) or other short distance communication technology to engage with alarm systems 13*a*. The robot 23 also includes one or more transmitters, also referred to as a beacon, that broadcasts a unique identifier to nearby alarm systems 13*a*, 13*b*. When deployed, as discussed below, the robot can use the communication reader and beacon 43' to interrogate security monitoring systems to send to the robot diagnostics.

Consider that the robot executes intrusion alarm verification processing. The robot includes a sensor package 110 that includes cameras and processes captured video using feature recognition technology to detect the presence of an alarm condition, i.e., an intrusion. The degree of feature recognition technology employed could be coarse. By coarse is meant that the processing employed is sufficient to detect a moving object, e.g., an entity moving in the facility, but is not sufficient to the degree of performing detailed facial recognition. The feature recognition need only detect a form of an object moving in the vicinity of the robot. Of course, detailed facial recognition processing could be employed. Other recognition technologies could be employed including audio transducers for detecting sounds including human voices, sounds made by walking, etc., and/or vibrations, etc., as well as detectors to detect odors, etc. The feature recognition could also be to detect or recognize physical intrusion conditions, such as opened doors or opened windows that should be closed, or other evidence of a physical intrusion.

To satisfy requirements in jurisdictions that require alarm notifications before police are dispatched to the site the robot 23 outfitted with the pre-selected sensor package 110 is deployed. The robotic electronics 25 using the appropriate sensor processing investigates the occurrence and reports/sends sensor data for evaluation.

Not shown in FIG. 8 are those conventional aspects of a robot, such as an exact body form for the robotic body 59, drive mechanism (that allows the robot to travel), appendages, etc. that would also be included.

Referring now also to FIG. 9, verification processing 120 is shown. At 122 the robot is within the residence or office and is normally in a quiescent or inactive state. Upon assertion of an alarm or other condition alert from an installed security system at 23, at 125 the installed security system that asserted the alarm, either is configured to send an activation message to the robot to wake up the robot 23 or a central system or local server processes the alarm condition and sends the activation message to the robot 23 to awaken the robot.

The robot 23 has "wake up processing." While the robot 23 is in a quiescent or inactive state, minimal circuitry in the robot is active such that at 124 the robot 23 receives the activation message (receiver circuitry) and at 126 processes the activation message to execute the wake up processing 47' to have the robot 23 transition from the quiescent or inactive state to an active state via the wakeup processing. At 128 the wake up processing activates all robotic circuitry including the robotic electronics 25 for verification of activation message. Upon execution of the wake up processing, the assertion of the alarm condition having been triggered from an alarm system, e.g., a security system, at 130 the robot that received the activation message parses either that message or interrogates the security system to send to the robot additional message(s) that include(s) conditions that caused assertion of the alarm condition. This information can be included in the activation message that caused the robot to transition from the quiescent or inactive state to an active state or in subsequent messages. In either event, either the activation message or subsequent message(s) from either the security system or the central system includes information that corresponds to the type of alarm condition that was asserted and the location(s) of the alarm condition(s). The robot includes a processing system that receives the messages, parses the alarm condition location information from the received message and sends the location information to the robot's guidance system.

The exact manner in which the parsed location information is conveyed and used by the guidance system would be determined based on the particular type/manufacturer, etc. of the robot and the specifics of the facility. Suffice it here to say that the robot would include a map of the facility within its guidance system (as one potential way to navigate the facility), the robot guidance system would specify formats etc. by which location data are sent to the guidance system and incorporated into the guidance system for physical navigation of the facility. At 132 the robot guidance system uses conventional techniques to determine a path from the robot's current position (typically a home station) to the alarm condition location. Using conventional robot guidance and object avoidance techniques the robot will travel to the location of the alarm condition.

As the robot moves towards the alarm condition location, at 134 the robot processing system also processes the type of alarm condition contained in the message to determine what sensors need to be activated on the robot. At 136 the robot processing 120 then tries to verify the condition.

If verified, at 136a the robotic processing sends an alarm verification message to the alarm system and/or a central system. If unable to verify the condition, at 136b the robotic processing sends an alarm non-verification message to the alarm system and/or a central system.

Upon receipt (at 137) of the alarm verification message or the alarm non-verification message depending on verification status at 137a, the alarm system and/or a central system will take different appropriate actions, such as calling authorities, e.g., police, fire, etc. depending on the condition (and local requirements) at 139a or cause a different verification process to be performed at 139b.

Figure 10:
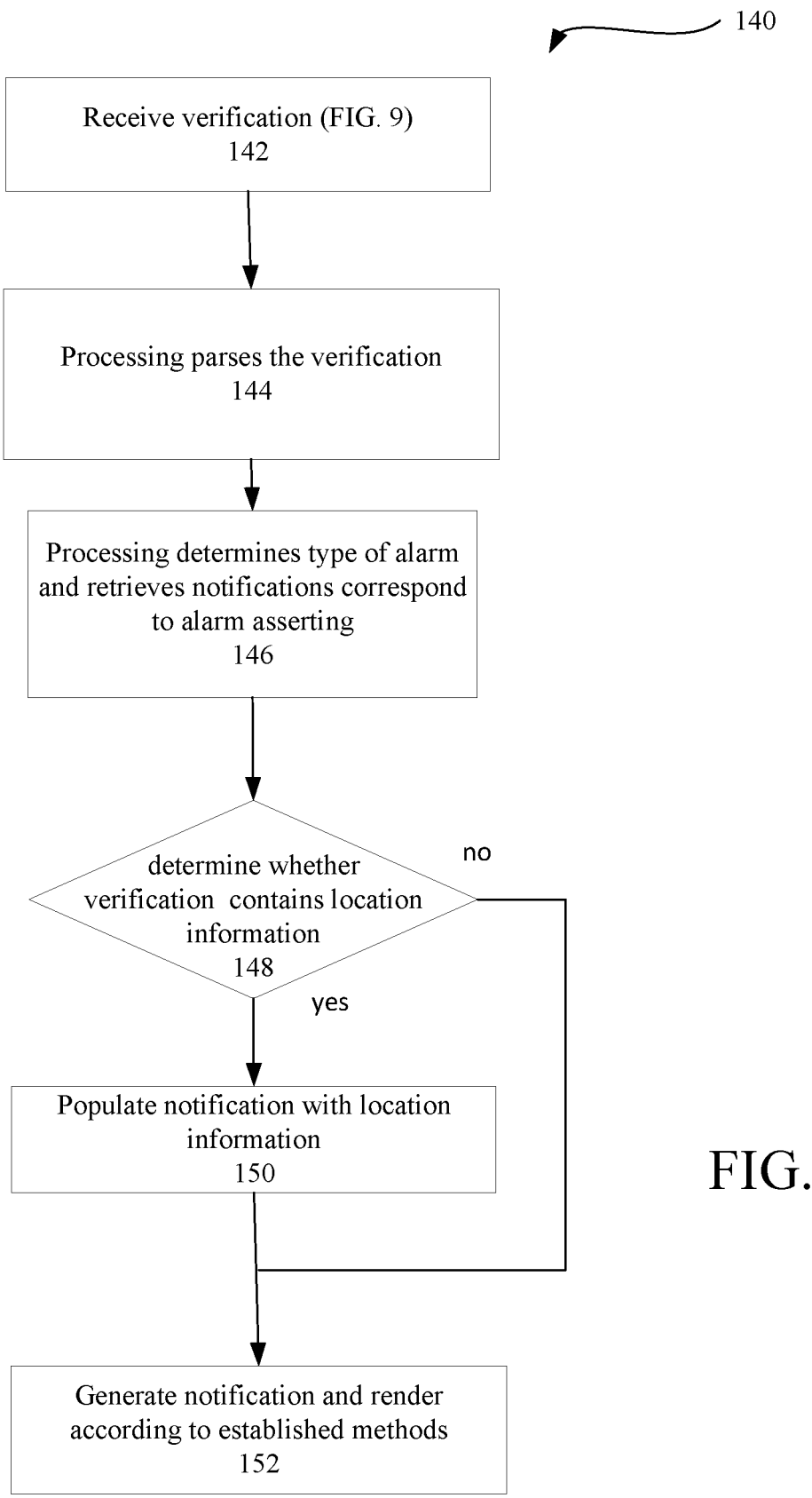

Referring now to FIG. 10, in some implementations, the robot processing 120 of the alarm condition (at 136 in FIG. 9) includes notification processing 140 that is used to retrieve specific alarm condition notifications that can be rendered to nearby persons, via an established mechanism(s), e.g., text message, cellular messages, display notifications, voice announcements, etc.

At 142 the robot processing 140 receives the verification from FIG. 9, at 144 parses the verification to retrieve specific alarm condition notifications at 146. At 148 the processing 140 determines whether the verification included location information (or other information that can be included in a notification). If other information is included at 150 the notification is populated with that information. At 152 the robot processing 140, generate the notification (either as retrieved or retrieved and populated), and renders, according to established methods.

Figure 11:
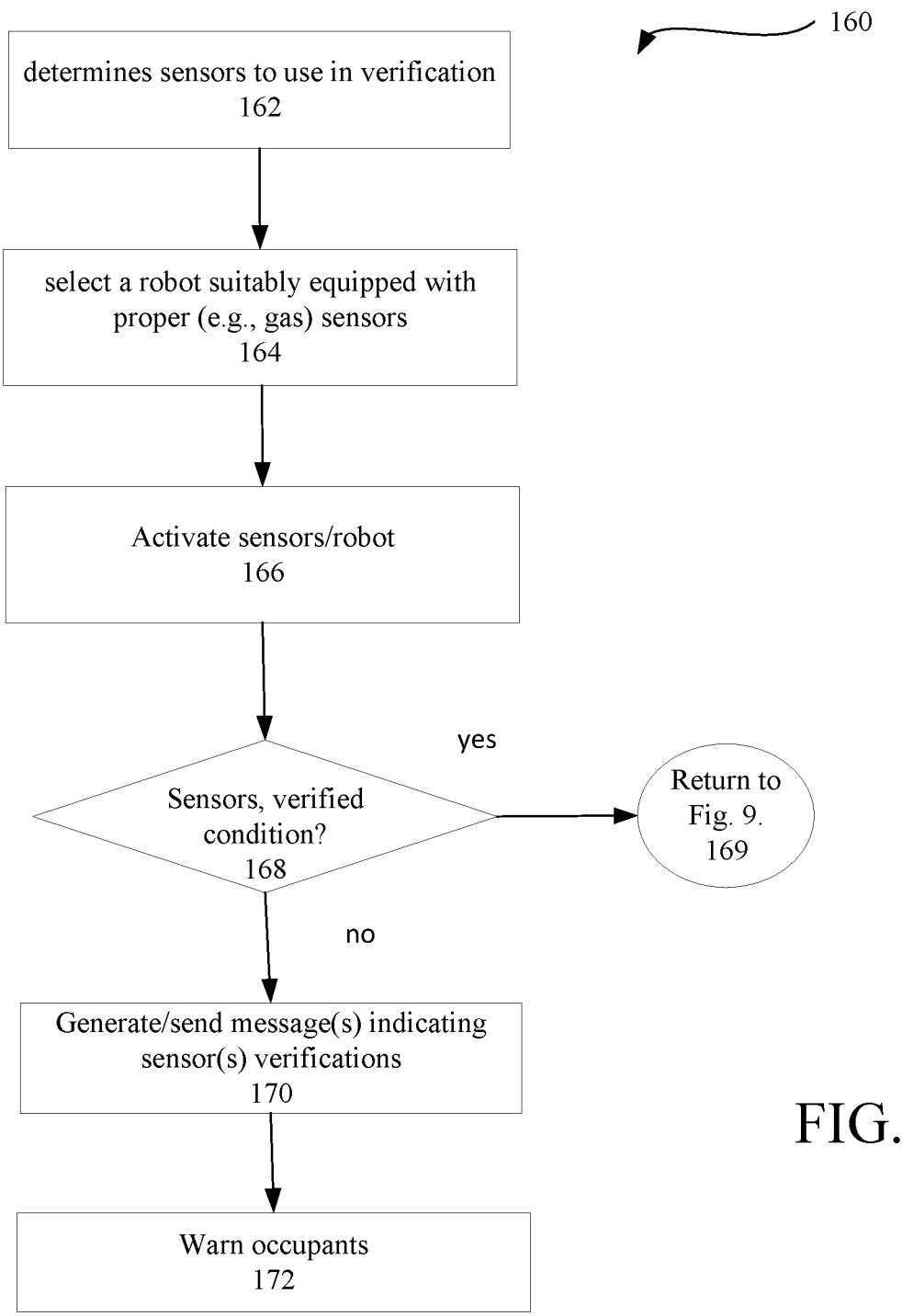

Referring now to FIG. 11, in some implementations, at 162 processing 160 determines sensors to use in verification of alarm condition. For example, most robots will include cameras or other video capture devices, as would often be used for robotic guidance. As the robot moves towards the alarm condition location, the robot is configured to capture video information and verify the alarm condition, such that police, etc. can be dispatched.

However, in some instances, video information may not be sufficient or enough. Consider instances that correspond to a release (whether accidental or purposeful) of a toxic substance, such as a gas. At 164 a central system selects a robot suitably equipped with proper gas sensors. At 166 the central system activates those sensors and the robot (as discussed above). This robot is used to verify that release at 168. While the release may not be verifiable from video data alone or at all, in these instances where video verification fails other sensor verifications can be used. When sensors verified condition, at 169 return to FIG. 9. When some sensor verifications pass and others fails, at 170 the robot sends to the central system (or alarm system) corresponding verification and non-verification message(s) according to sensors indicating status of verification per sensor, and whether other approaches for verification may be required. At 172 warn occupants. By sending verifications on a sensor basis that could give clues to other verification approaches of the types of equipment, sensors, etc. needed by those other verification approaches.

The robot 23 can be used to satisfy requirements in such jurisdictions that require verification of alarm notifications prior to dispatch of police (or other emergency personnel). This is performed without the use of constant video surveillance. In the instance of the robot acting as the agent the data and processing capabilities performed by the robot can be verified remotely by a human being. This processing thus alleviates at least some of the privacy concerns, by use of the enabled robot that reacts upon the assertion of alarm condition trigger by the security system.

Any of the foregoing functional and structural variations to implement with autonomous mobile unmanned machines such as robots and drones can be combined into autonomous mobile unmanned machines having multiple functions. For example, the doorway processing can be incorporated in any or all of the implementations. In other examples, an autonomous mobile unmanned machine can be equipped with intrusion alarm verification processing, platform gunshot detection processing, and badge challenge processing. Other combinations are possible.

Program instructions stored in the memory along with configuration data may control overall operation of the drone or robot, modified as discussed above to provide the functionality disclosed herein.

An example monitoring station can be a single physical monitoring station or center in FIG. 2. However, it could alternatively be formed of multiple monitoring centers/stations, each at a different physical location, and each in communication with the data network. The central monitoring station includes one or more monitoring server(s) each processing messages from the drones and/or user devices (not shown).

The monitoring server may include a processor, a network interface and a memory (all not illustrated). The monitoring server may physically take the form of a rack mounted card and may be in communication with one or more operator terminals (not shown). An example monitoring server is a SURGARD' SG-System III Virtual, or similar system.

The processor of each monitoring server acts as a controller for each monitoring server, and is in communication with, and controls overall operation, of each server. The processor may include, or be in communication with the memory that stores processor executable instructions controlling the overall operation of the monitoring server. Suitable software enables each monitoring server to receive alarms and cause appropriate actions to occur. Software may include a suitable Internet protocol (IP) stack and applications/clients.

Each monitoring server of central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service. The network interface may be a conventional network interface that interfaces with the network (FIG. 1) to receive incoming signals, and may for example take the form of an Ethernet network interface card (NIC).

Servers can be any of a variety of computing devices capable of receiving information, such as a server, a distributed computing system, a rack-mounted server and so forth. Server may be a single server or a group of servers that are at a same location or at different locations. Servers can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory and a bus system including, for example, an information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory computer readable hardware storage devices and media and other types of non-transitory storage devices.

Embodiments can be implemented in digital electronic circuitry, or in computer hardware, firmware, software, or in combinations thereof. Computer programs can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Hardware storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Other embodiments are within the scope of the following claims.

What is claimed is:

1. A method comprising:
   receiving, from a security system, by an autonomous mobile unmanned machine that includes at least one sensor device suitable to verify an alarm condition, an alarm condition message that is asserted as a result of an alarm condition existing within a facility;
   interrogating the security system, by the autonomous mobile unmanned machine, to cause the security system to send additional messages related to conditions that resulted in an assertion of the alarm condition message;
   receiving, from the security system, by the autonomous mobile unmanned machine, responsive to the interrogating, a location of the alarm condition that resulted in the assertion of the alarm condition message;
   programming the autonomous mobile unmanned machine with a route from a current location of the autonomous mobile unmanned machine to the location of the alarm condition;
   collecting, by the at least one sensor device carried by the autonomous mobile unmanned machine, sensor data at least at the location of the alarm condition; and
   sending the sensor data to the security system.

2. The method of claim 1, further comprising:
   processing, by the autonomous mobile unmanned machine, the sensor data;
   determining, by the autonomous mobile unmanned machine, whether the collected sensor data verifies the alarm condition; and
   sending a message including a result of the determining to the security system.

3. The method of claim 1, wherein the autonomous mobile unmanned machine is a robot, and the robot includes:
   one or more sensors selected from motion detectors, noxious gas sensors, smoke/fire detectors, cameras, microphones, directional microphones, temperature sensors, vibration sensors, air movement/pressure sensors, and chemical/electro-chemical sensors; and
   a wireless communication device to broadcast a message to the security system that asserted the alarm condition message to interrogate the security system regarding a status of the security system.

4. The method of claim 1, further comprising:
sending the sensor data by the security system to a remote central monitoring center;
processing, by the remote central monitoring center, the sensor data;
determining by the remote central monitoring center whether the sensor data verifies the alarm condition; and
sending a result of the determining as a notification of a verification or a non-verification.

5. The method of claim 1, wherein the autonomous mobile unmanned machine is a robot.

6. The method of claim 1, wherein the security system is within the facility.

7. The method of claim 1, further comprising:
processing, by the security system, an indication of the alarm condition to produce the alarm condition message.

8. A system comprises:
a security system deployed within a facility and including a server;
an autonomous mobile unmanned machine that includes at least one sensor device and a processor configured to:
receive, from the security system, an alarm condition message that is asserted as a result of an alarm condition existing within the facility;
interrogate the security system to cause the security system to send additional messages related to conditions that resulted in an assertion of the alarm condition message;
receive, from the security system responsive to interrogating the security system, a location of the alarm condition that resulted in the assertion of the alarm condition message;
produce a route from a current location of the autonomous mobile unmanned machine to the location of the alarm condition; and
collect, by the at least one sensor device, sensor data at least at the location of the alarm condition.

9. The system of claim 8, further comprising:
a remote central monitoring center comprising one or more servers configured to:
receive the sensor data;
determine whether the sensor data verifies the alarm condition; and
send a result of a determination of whether the sensor data verifies the alarm condition as a notification of a verification or a non-verification.

10. The system of claim 8, wherein the autonomous mobile unmanned machine is further configured to:
process the sensor data;
determine whether the sensor data verifies the alarm condition; and
send a result of a determination of whether the sensor data verifies the alarm condition.

11. The system of claim 8, wherein the autonomous mobile unmanned machine includes one or more sensors selected from motion detectors, noxious gas sensors, smoke/fire detectors, cameras, microphones, directional microphones, temperature sensors, vibration sensors, air movement/pressure sensors, and chemical/electro-chemical sensors.

12. The system of claim 8, wherein the autonomous mobile unmanned machine is a robot that includes a wireless communication device to broadcast to the security system that asserted the alarm condition message to interrogate the security system regarding a status of the security system.

13. The system of claim 8, wherein the security system is within the facility.

14. The system of claim 8, wherein the security system is further configured to:
process an indication of the alarm condition to produce the alarm condition message.

15. An autonomous mobile unmanned machine comprising:
one or more sensors and selected from motion detectors, noxious gas sensors, smoke/fire detectors, cameras, microphones, directional microphones, temperature sensors, vibration sensors, air movement/pressure sensors, and chemical/electro-chemical sensors; and
a processor configured to:
receive, from a security system, an alarm condition message that is asserted as a result of an alarm condition existing within a facility;
interrogate the security system to cause the security system to send additional messages related to conditions that resulted in an assertion of the alarm condition message;
receive, from the security system responsive to the interrogating, a location of the alarm condition that resulted in the assertion of the alarm condition message;
produce a route from a current location of the autonomous mobile unmanned machine to the location of the alarm condition; and
collect, by the one or more sensors, sensor data at least at the location of the alarm condition.

16. The autonomous mobile unmanned machine of claim 15, further comprising a wireless communication device to broadcast to the security system that asserted the alarm condition message to interrogate the security system regarding a status of the security system.

* * * * *